INVENTORS
Philip D. Bartlett
Donald L. Bishop
Sidney B. Whittier
and
Albert L. V. Knight
BY Brown and Mikulka
and
Robert E. Cobb
ATTORNEYS Feb. 17, 1959 P. D. BARTLETT ET AL 2,873,657

PHOTOGRAPHIC APPARATUS

Filed March 3, 1955 3 Sheets-Sheet 2

INVENTORS
Philip D. Bartlett
Donald R. Bishop
Sidney B. Whittier
and
Albert L. H. Wright BY Brown and Mikulka
and
Robert E. Corb
ATTORNEYS INVENTORS
Philip D. Bartlett
Donald R. Bishop
Sidney B. Whittier
and
Albert E. H. Wright BY Brown and Mikulka
and
Robert E. Corb
ATTORNEYS United States Patent Office 2,873,657

Patented Feb. 17, 1959

2,873,657

PHOTOGRAPHIC APPARATUS

Philip D. Bartlett, Worcester, Donald R. Bishop, Westwood, Sidney B. Whittier, Concord, and Albert L. H. Wright, Wellesley, Mass., assignors to Polaroid Corporation, Cambridge, Mass., a corporation of Delaware Application March 3, 1955, Serial No. 491,982

31 Claims. (Cl. 95—13)

This invention relates to photography and, more particularly, to novel photographic apparatus for exposing and processing a photosensitive strip.

An object of the present invention is to provide photographic apparatus for exposing successive frames of a photosensitive strip and thereafter predeterminedly processing said frames by superposing them on areas of another strip and distributing a processing liquid between the strips, the frequency of exposure of successive frames of the photosensitive strip being independent of the rate at which the processing occurs and the time required for processing each frame.

Another object of the invention is to provide photographic apparatus for processing successive sandwiches, each of which comprises a frame of a photosensitive strip and a superposed area of another strip with a layer of processing composition therebetween, wherein the successive sandwiches are cut to accurately predetermined length and the duration of the processing period for each sandwich is a function of the length of said sandwich and the rotational speed of a pair of juxtaposed rollers between which each sandwich is advanced.

A further object of the present invention is to provide photographic apparatus of the above type comprising means for superposing successive exposed frames of a photosensitive strip with successive areas of another strip and spreading a processing composition carried by one of said strips in a layer between said frames and areas to form sandwiches, means for severing successive sandwiches of accurately predetermined length from the remaining portions of said strips, means for advancing each successive sandwich at a controlled rate through a processing chamber during a predetermined processing period, and means for ejecting the processed sandwich from said chamber at the end of said processing period.

Still other objects of the present invention are to provide, in apparatus of the above type: guide means for positioning successive frames of a photosensitive strip for exposure, pressure-applying means for superposing successive exposed frames with successive areas of another strip and spreading processing liquid from successive rupturable containers, secured to said other strip in association with each successive area, in a layer between each frame and area to form a sandwich, and cutting means for severing each sandwich adjacent the ends of said frame and area so as to separate the portion of said sandwich including said frame and area from the portion of said sandwich including said container and from the remaining portions of said strips; means defining a processing chamber within which successive sandwiches are maintained in a light-free environment during a predetermined processing period, means within said processing chamber for advancing successive sandwiches through said chamber at a predetermined rate, and means at one end of said chamber for ejecting successive sandwiches therefrom at the end of said processing period; and a pair of processing timing rollers mounted within said processing chamber for advancing said sandwiches through said chamber at a predetermined rate, a pair of ejection rollers mounted at one end of said chamber and positioned to engage and rapidly advance each of said sandwiches from said chamber as it is advanced from between said timing rollers, and means for advancing the end of each of said sandwiches into the bite of said timing rollers following its severance from the remaining portions of said strips.

Still further objects of the present invention are to provide: photographic apparatus of the above type wherein the processing period for successive sandwiches is controlled by a pair of timing rollers between which said sandwiches are advanced at a constant predetermined rate into the bite of a pair of ejection rollers; photographic apparatus of the above type wherein said processing timing rollers are rotated at a relatively slow speed, said ejection rollers are rotated at a relatively fast speed and the two pairs of rollers are so positioned with respect to one another that the leading edge of each sandwich is advanced by timing rollers into the bite of said ejection rollers immediately prior to the disengagement of the trailing edge of said sandwich from said timing rollers; and, in apparatus of the above type, means for driving and controlling the various elements thereof.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
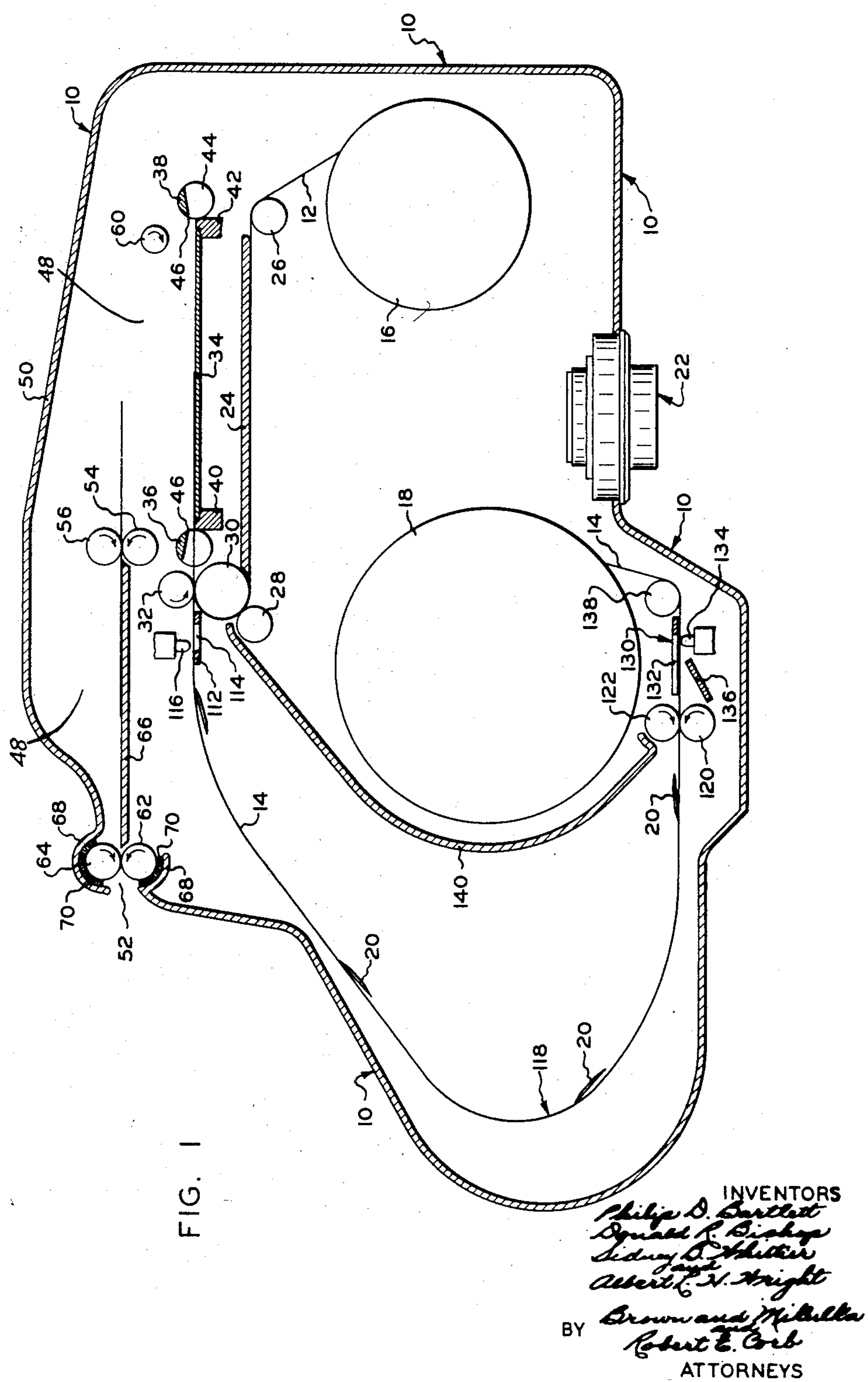
Figure 1 is a diagrammatic sectional view of an automatic camera embodying the present invention.

Photographic apparatus of the type herein illustrated generally includes means for processing an exposed photosensitive strip by superposing said photosensitive strip on another strip and spreading a thin layer of processing composition between said strips. The photosensitive strip includes a layer of photosensitive material, preferably an emulsion of silver halide, in which a latent image may be attained by differential exposure to actinic light cast on a suitable support or backing. The other strip is adapted to serve as a support for an image-receptive layer in which a visible print of a latent image in a photosensitive layer may be produced. The processing composition, when spread in a uniformly thin layer between the photosensitive and other strips, preferably effectuates a silver halide diffusion transfer-reversal process by which a latent image in the photosensitive strip is developed and a positive print is produced in the other strip. A processing composition, for example, contains an aqueous solution of a silver halide developer such as hydroquinone, a silver halide solvent such as sodium thiosulfate and an alkali such as sodium hydroxide. In this processing the photosensitive and other strips are maintained in superposed relation with the layer of processing composition interposed between them for a predetermined period ordinarily of approximately 40 to 120 seconds in duration, during which the exposed silver halide of the photosensitive strip is reduced to silver and unreduced silver halide of the photosensitive strip forms a water-soluble complex silver salt which diffuses through the layer of composition to the other strip where, upon being reduced to silver, it forms a visible print. Examples of photographic materials useful in the processes of the foregoing type are described in detail in Patent No.

2,543,181, issued to Edwin H. Land on February 27, 1951. It is, of course, to be understood that the apparatus herein described is not limited to use with any particular species of photosensitive or other strips, the terms "photosensitive" and "other" being used in their broadest sense to indicate a first strip which is photosensitive and another strip which merely may aid in spreading the processing composition over the surface of the photosensitive strip and which may, if desired, possess other characteristics.

The embodiment of the herein disclosed invention, illustrated in the accompanying drawings, is in the nature of an automatic camera including means such as a conventional lens and shutter (illustrated diagrammatically) for exposing successive frames of a strip of photosensitive material advanced within said camera. The camera includes means for mounting supplies of a photosensitive strip and another strip and for positioning successive frames of the photosensitive strip for exposure to light from the lens means. A pair of pressure-applying rollers are provided between which the photosensitive and other strips are advanced in superposed relation whereby given frames of the photosensitive strip are registered with given areas of the other strip. The other strip has on one of its surfaces a succession of processing composition containers, one container being associated with one area. During advancement of portions of the strips between the rollers, a container is caused to eject its processing composition, which thereafter is spread between a frame and the area of the other strip superposed therewith to form a sandwich. The sandwich is advanced into a processing chamber wherein cutting means, provided therein, sever the sandwich at two places for separating an end portion of the sandwich carrying the ruptured container from the portion including the frame and area, and for separating the latter portion from the remaining photosensitive and other strips. Each sandwich is permitted to remain in the processing chamber for a predetermined period during which the latent image in its frame of the photosensitive strip is processed and a positive image is formed in the area of the other strip registered therewith. The duration of this processing period is controlled by a pair of processing timing rollers and a pair of ejection rollers mounted within the processing chamber. Means are provided for advancing each sandwich immediately following its severance from the photosensitive and other strips, into the bite of the timing rollers which are rotated at a uniform predetermined speed so as to advance each sandwich into a bite of the ejection rollers when the processing period has elapsed. The ejection rollers are rotated at a fairly rapid speed and eject the processed sandwich from the processing chamber immediately as it is advanced from engagement with the timing rollers. It is by virtue of this arrangement of cutting means, processing timing rollers and ejection rollers that the frequency of exposure of successive frames of the photosensitive strip is rendered substantially independent of the time required for processing each frame, and a sandwich containing each frame is ejected from the processing chamber of the camera in a completely processed condition, free of the container in which the processing liquid was supplied. Following ejection from the processing chamber, the frame and area may be immediately separated, for example by means associated with the ejection rollers, and stacked without the necessity for allowing for further processing in a light-free environment.

While the invention is illustrated herein as a camera for exposing and processing successive frames of a comparatively elongated photosensitive strip, it may be embodied in processing apparatus, for example apparatus for processing successive film assemblages which may have been exposed elsewhere. The apparatus would be particularly suited, for example, for processing film assemblages which include a photosensitive and another sheet and have a liquid-carrying container mounted adjacent one end and means for trapping any excess of processing liquid adjacent the other end. The exposed assemblages could be fed, at almost any frequency, between the pressure-applying rollers for distributing the processing liquid from the container between the sheets to form a sandwich and the saidwich thus formed is cut adjacent its ends to a predetermined length to sever the image-carrying portion of the sheets from the portions carrying the container and the liquid-trapping means. The processing period for each sandwich would, of course, be a function of the length of the cut sandwich and the rotational speed of the timing rollers.

Reference is now made to the drawings, wherein like numerals denote like parts, and particularly to Fig. 1 wherein there is shown somewhat diagrammatically a camera embodying the present invention. As a means for supporting and enclosing the various components of the camera, there is provided a lighttight housing generally designated at 10. Within housing 10 is mounted a supply of a photosensitive strip as illustrated at 12 and preferably comprising a suitable base and a suitable photosensitive layer on one side of the base. The photosensitive layer, for example, may be composed of a silver halide emulsion and is provided with a succession of frames which are adapted to receive a series of latent images upon exposure. A supply of another strip designated at 14 is mounted within housing 10 and preferably comprises a base and a suitable image-receiving layer on one side of the base. The image-receiving layer, for example, may comprise one of the compositions, now well known in the art, which adapt it to receive, in successive image-receiving areas thereof, positive prints of the latent images in frames of photosensitive strip 12. Strip 12 is preferably coiled on a spool 16 of conventional design located within the housing adjacent one end thereof and strip 14 is preferably coiled on a somewhat larger supply spool 18 of conventional design pivotally mounted in the lower portion of the housing toward the other end thereof. Spool 18 is somewhat larger than spool 16 in order to accommodate the greater cross-sectional bulk of strip 14, due in large measure to a succession of containers 20 provided for carrying a liquid processing composition. As shown, containers 20 are affixed to strip 14 at substantially regularly spaced intervals from a location adjacent its leading end toward its trailing end, the containers being so spaced that one container is associated with one image-receiving area. Each container is provided with a rupturable mouth facing the trailing end of strip 14, this mouth being adapted to eject processing composition when opposed compressional forces are applied to the container.

A conventional lens and shutter assembly designated at 22 is mounted on a lower wall of housing 10 in position to direct light upwards along a path between spools 16 and 18. As a means for positioning successive frames of strip 12 for exposure to actinic light from the lens of assembly 22, there is provided such means as a guide plate 24 positioned above and between spools 16 and 18 and with its lower surface substantially at the focal surface of the lens. Successive frames of strip 12 are advanced in contact with the lower surface of plate 24 and are thereby positioned for exposure. A pair of guide rollers 26 and 28 are provided at opposite ends of plate 24 for retaining strip 12 in contact with the lower surface of guide plate 24, strip 12 being advanced along a path extending from spool 16, around the upper portion of guide roller 26 and across plate 24 to guide roller 28.

Pressure-applying means are provided for processing latent images in frames of strip 12 and, in the form shown, comprise a pair of rollers 30 and 32 between which strips 12 and 14 may be superposed. Means, later to be described in detail, are provided for causing rotation of the rollers and thereby for advancing the strips between them. Advancement of a frame of strip 12 and an associated image-receiving area of strip 14 between the rollers causes ejection of the processing composition from the mouth of a container 20 and spreading of the processing composition between the frame and the area to form a sandwich. Within the sandwich the latent image in the frame is processed and a positive print is formed in the image-receiving area.

Rollers 30 and 32 are mounted in juxtaposed relation above and adjacent one end of guide plate 24, roller 30 being positioned closely adjacent or in contact with guide roller 28. Resilient means (not shown) may be provided for urging rollers 30 and 32 toward one another so that they apply compressive pressure to the strips as they are advanced between the juxtaposed surfaces of the rollers. In practice, strip 12 extends from guide plate 24 between rollers 28 and 30 into superposition with strip 14 between rollers 30 and 32 to form a sandwich.

In accordance with the present invention, there is provided a generally flat elevator platform 34 normally positioned above guide plate 24 in a plane substantially tangent to the surfaces of rollers 30 and 32 and in position to support a sandwich comprising strips 12 and 14 as the sandwich is advanced from between rollers 30 and 32. Cutting means are provided adjacent each end of platform 34 for severing the portion of a sandwich supported thereon and including a superposed frame and area from the leading end portion of the sandwich, which includes a collapsed container 20 and from the remaining portions of strips 12 and 14 extending between rollers 30 and 32. The two cutting means mounted at opposite ends of platform 34 are substantially the same and include blades 36 and 38 and anvils 40 and 42 mounted, respectively, adjacent rollers 30 and 32 and at the opposite end of platform 34. Platform 34 is adapted, when in its normal position, to be seated at its ends on portions of anvils 40 and 42 and with its upper support surface flush with the upper or support surface of the anvils. Each blade includes a pair of disk-like elements 44 at its opposite ends and a cutting edge 46 extending between the disk-like elements. Blades 36 and 38 are mounted for pivotal movement about axes extending through the central portions of disk-like elements 44 and lying substantially in the plane of the upper support surfaces of platform 34 and anvils 40 and 42. A suitable receptacle may be provided adjacent blade 38 between the latter and the end wall of the housing to receive the end portions severed from the sucessive sandwiches.

There is provided in the upper portion of housing 10 a processing chamber generally designated at 48 located above elevator platform 34 and in which a succession of sandwiches formed by rollers 30 and 32 is permitted to remain during a predetermined processing period. Processing chamber 48 is defined by upper wall 50 of housing 10 and extends from one end of the housing adjacent cutting blade 38 at the end of platform 34 spaced furthest from rollers 30 and 32 to the opposite end of housing 10 wherein there is provided an exit passage 52 through which processed sandwiches may be ejected.

As a means for controlling the processing time during which each sandwich is permitted to remain within processing chamber 48, there is provided a pair of timing rollers 54 and 56 positioned within chamber 48 above cutting blade 36 and urged toward one another by spring means illustrated schematically at 57. The processing time for each sandwich is accurately controlled by the rotation of rollers 54 and 56 at a uniform predetermined speed which is sufficient to advance a sandwich positioned between the rollers through chamber 48 toward passage 52 a distance equal to the accurately predetermined length of the sandwich during the predetermined processing period. In the operation of the camera, the sheared end of the sandwich adjacent blade 36 is inserted, immediately following cutting, into the bite of rollers 54 and 56, the latter being in constant rotation at a speed adapted to advance the sandwich completely between the rollers during the predetermined processing period.

Means are provided for advancing the end of a sandwich into the bite of timing rollers 54 and 56 immediately as the sandwich is cut to a predetermined length and, in the form shown, comprises elevator platform 34 having a curved end portion 58 extending beyond cutting blade 38. Platform 34 is mounted at end portion 58 for limited pivotal movement in a clockwise direction (viewing Fig. 1) about an axis adjacent blade 38 and in substantially the same plane as the axis of rotation of blades 36 and 38. Following cutting of the sandwich, platform 34 is pivoted upward and in a clockwise direction to elevate the end of a sandwich supported thereon to a position adjacent timing rollers 54 and 56. As a means for feeding the end portion of the sandwich into the bite of the rollers, there is provided an elevator roller 60 positioned slightly above the end of platform 34 adjacent cutting blade 38. Roller 60 is rotated in a clockwise direction, and as platform 34 is rotated upward the sandwich is brought into contact with roller 60 and is propelled thereby into the bite of timing rollers 54 and 56. The elevator platform is then returned to its former position to receive the next successive sandwich as it is advanced from between rollers 30 and 32.

Means are provided for ejecting each successive sandwich from processing chamber 48 through exit passage 52 when the predetermined processing period for each assemblage has elapsed. In the form shown, these means comprise a pair of ejection rollers 62 and 64 mounted at the end of chamber 48 adjacent passage 52. Ejection rollers 62 and 64 are resiliently urged toward one another by spring means shown schematically at 65 and are rotated at a comparatively rapid speed so as to rapidly advance a sandwich through passage 52 almost immediately as an edge of the sandwich is advanced into the bite of the rollers and engaged thereby. Ejection rollers 62 and 64 are so positioned with respect to the timing rollers 54 and 56 that the leading edge of a sandwich, advanced between rollers 54 and 56, is engaged by rollers 62 and 64 just prior to the advancement of the trailing edge of the sandwich out of engagement with rollers 54 and 56. In this manner, ejection rollers 62 and 64 "grab" the leading edge of each sandwich and then cooperate with timing rollers 54 and 56 to eject the sandwich from chamber 48 at the moment that it is "released" by the timing rollers. A plurality of sandwiches, arranged in a stacked relation with the leading edge of each successive sandwich spaced slightly behind the sandwich immediately above, may be advanced between rollers 54 and 56 at the same time and advanced one at a time into the bite of rollers 62 and 64.

As a means for guiding a sandwich from rollers 54 and 56 into the bite of rollers 62 and 64, there is provided a support plate 66 extending from adjacent roller 54 to a point adjacent roller 62 and having an upper support surface disposed in a plane substantially tangent to said rollers at their upper surfaces. Additionally, upper housing wall 50 converges toward plate 66 adjacent roller 64 to guide the sandwiches between the latter and roller 62. Means are provided for rendering passage 52 lighttight and, in the form shown, comprise curved portions 68 of the walls of housing 10 defining the passage and shaped to conform to the peripheries of rollers 62 and 64. The rollers are mounted closely adjacent curved portions 68 and the latter are provided with pads 70 of a tufted fabric, felt or the like adapted to bear against the surfaces of the rollers and prevent the admission of light between the rollers and portions 68. In another form of the invention, there may be provided means defining a curved passage through which the sandwich may be ejected and which, due to its curvature, prevents the admission of light into chamber 48.

Figure 3:
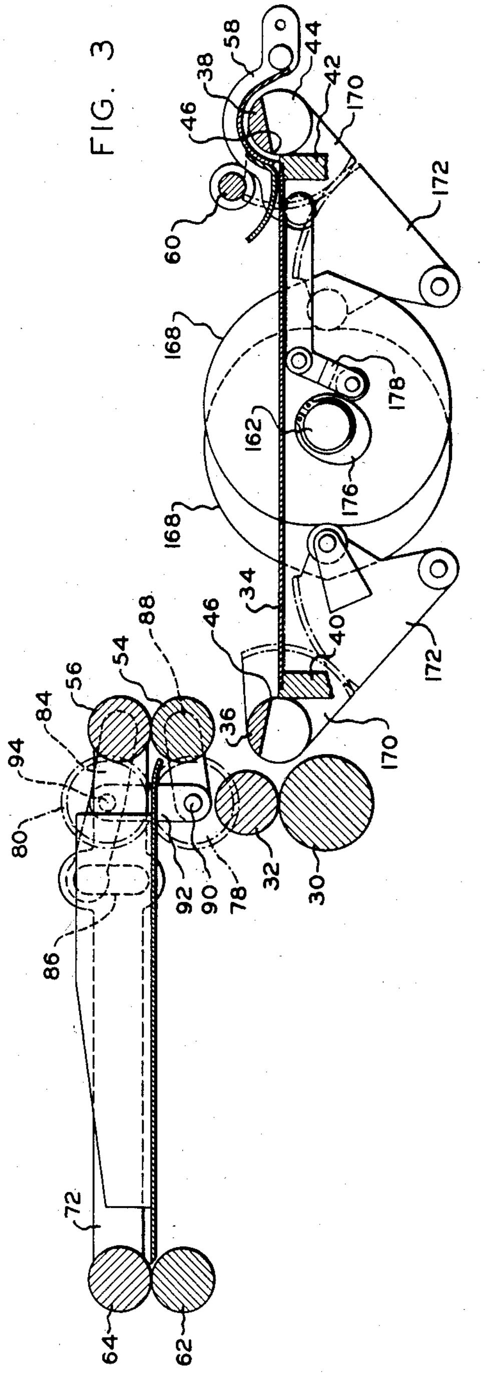
Figs. 2 and 3 are detailed views, partially in section, of elements of the mechanism of Fig. 1.
Figure 2:
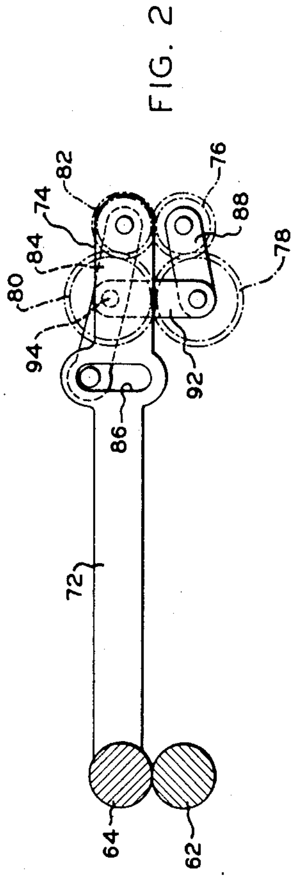

The speed at which successive sandwiches are advanced between rollers 54 and 56 is substantially constant and is a function of the predetermined processing time which may vary, for example, from 40 to 120 seconds. On the other hand, the frequency at which successive frames of strip 12 may be exposed is independent of the required processing period and may be varied from a single exposure at infrequent intervals to a maximum which is limited only by the practical limitations of the possible speed of advancement of the strip and the time required for exposure. It becomes apparent from the foregoing that when processing requires a relatively long period (60 seconds, for example) and successive exposures are made at a comparatively rapid frequency (50 per minute, for example), it may be necessary to advance a considerable number of successive sandwiches through processing chamber 48 and between timing rollers 54 and 56 at one time. In order to accommodate a large number of sandwiches in stacked relation and advance the sandwiches at a constant predetermined speed, timing rollers 54 and 56 are mounted on novel linkage means permitting a relatively large separation of the rollers, while driving both rollers at a constant angular velocity. In the form shown in Fig. 3, timing roller 54 is rotatably mounted in a fixed position and roller 56 is mounted on the linkage means for movement with respect to roller 54. The linkage means comprises a pair of elongated support arms 72 mounted at one end for pivotal movement about the axis of roller 64. Roller 58 is mounted for rotary movement at its ends between the free end portions 74 of support arms 72. Roller 56 is driven by means, to be described in detail later, and is provided with gears 76 secured at its ends. Roller 58 is driven from roller 56 by two pairs of meshed transfer gears 78 and 80, transfer gears 78 being meshed with gears 76 and transfer gears 80 being meshed with a pair of gears 82 secured at opposite ends of roller 56. The linkage means for mounting the transfer gears 78 and 80 comprises a pair of upper link arms 84 each being pivotally secured at one end to arm 72 at the axis of roller 56 and secured at its other end for limited sliding movement in a transverse slot 86 in arm 72, and a pair of lower link arms 88 each pivotally secured at one end at the axis of roller 54. Transfer gears 78 are mounted on a shaft 90 pivotally mounted at its ends in the other or free ends of lower link arms 88. A pair of connecting link arms 92 are provided, each pivotally secured at one end to the free end of a lower link arm 88 and at its other end to an upper link arm 84 intermediate the ends of the latter. Transfer gears 80 are mounted on a shaft 94 pivotally secured at its ends in upper link arms 84 for rotary movement about an axis through the point at which upper link arms 84 and connecting link arms 92 are pivotally connected. It is by virtue of this arrangement of links and gears that roller 56 is driven from roller 54 at the same angular speed as the latter and the spacing between the rollers may be varied without changing the angular velocity of roller 56 relaive to that of roller 54.

Figure 4:
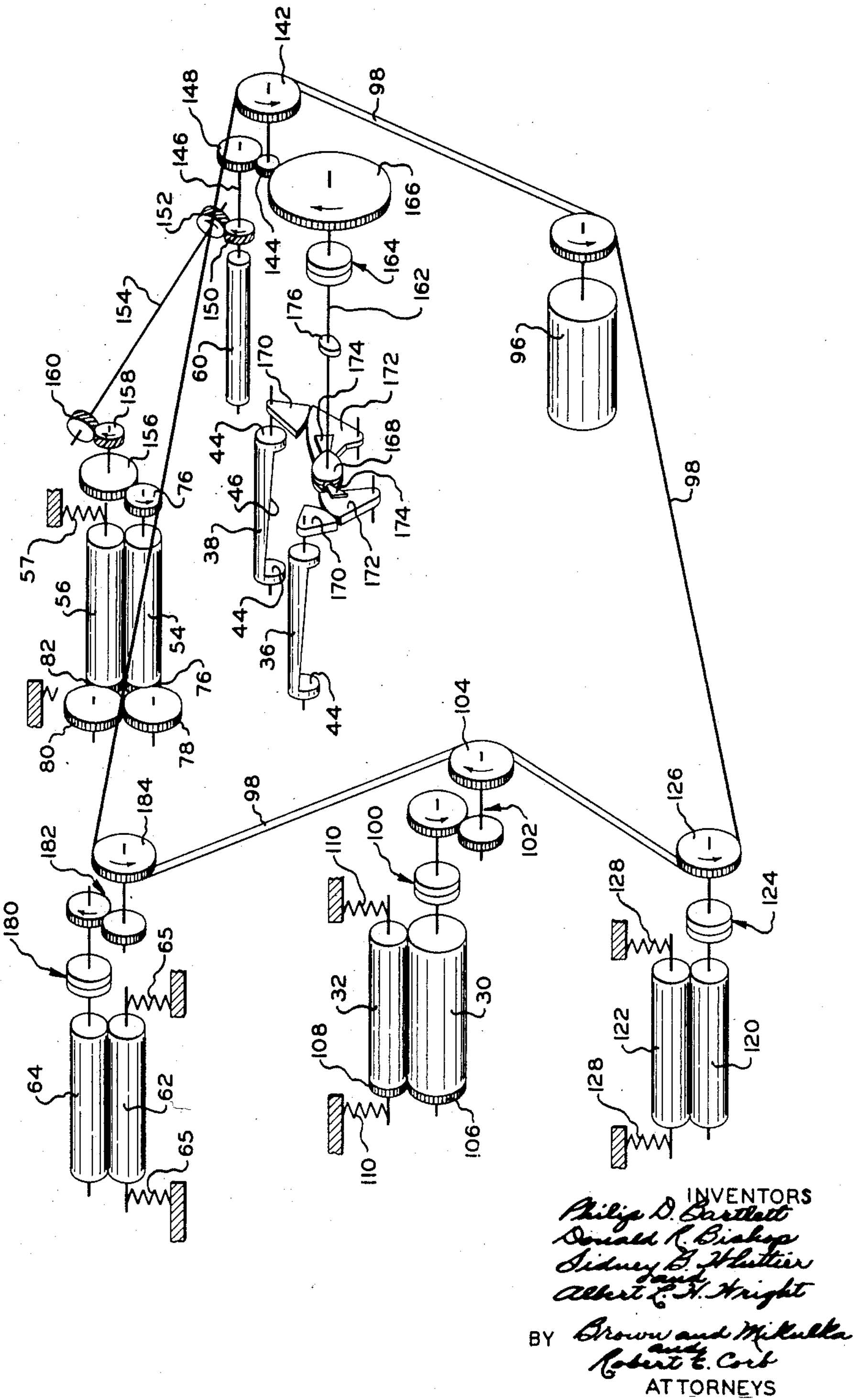
Fig. 4 is a perspective view showing schematically the drive and control mechanism of the camera of Fig. 1.

In accordance with the present invention, drive and control means are provided for operating the components of the camera mechanism. This drive means, as illustrated diagrammatically in Fig. 4, includes a continuously running motor 96 operatively connected to the various components of the camera mechanism through such means as an endless drive chain 98. As a means for rotating pressure rollers 30 and 32 to advance a sandwich into the processing chamber, roller 30 is operatively connected through preferably a magnetic clutch 100, transfer gears 102 and a sprocket 104 engaged by drive chain 98. Rollers 30 and 32 are provided with, respectively, gears 106 and 108 secured to their ends and adapted to mesh with each other for driving roller 32. Resilient means, provided for urging roller 32 toward roller 30, are illustrated schematically at 110.

In order to arrest the movement of the sandwich upon advancement of a predetermined length thereof between pressure rollers 30 and 32, there are provided control means for deactuating magnetic clutch 100, thereby disconnecting rollers 30 and 32 from the drive mechanism and discontinuing the rotation of the rollers. This control means is so constructed and arranged as to provide for arresting movement of the sandwich when one frame of strip 12 and the image-receiving area of strip 14 with which it is registered have advanced into processing chamber 48 and a frame of strip 12 is in position for exposure on the surface of guide plate 24. In order to adapt it for use in the illustrated embodiment, strip 14 may be provided with regularly spaced pairs of configurations, preferably apertures, the openings in a pair being located at opposite edges of strip 14 and one pair being associated with one image-receiving area. The control means includes a bearing member 112 located adjacent rollers 30 and 32 and having a bearing surface across which strip 14 is adapted to move. The surface of member 112 is provided with a pair or grooves or slots 114 over which the pairs of apertures are adapted to move in aligned relation, thus permitting a pair of stop pins 116, mounted in alignment with grooves 114, to project into a pair of apertures in strip 14 when the apertures become aligned with the pins during advancement of the strip. Pins 116 are amounted for limited movement in the direction of advancement of strip 14 and in a direction substantially perpendicular to the plane of said strip as it is advanced across bearing member 112. Resilient means are provided for urging pins 116 into contact with strip 14 and in a direction opposite the direction of advancement of the strip. A suitable switch is provided in the electrical circuit for energizing magnetic clutch 100 and is adapted to be opened by movement of pins 116 in the direction of advancement of strip 14 to disengage clutch 100 and discontinue the rotation of rollers 30 and 32.

The processing cycle for an exposed frame is commenced, for example, by closing the aforementioned switch to engage magnetic clutch 100 and rotate rollers 30 and 32. This may be effected either manually whenever desired, or by suitable automatic timing means at a predetermined frequency, or by means associated with the shutter mechanism of assembly 22 each time an exposure is made.

Strip 14 is supplied from spool 18 and is advanced intermittently at a substantially rapid rate between rollers 30 and 32. Any sudden advancement of this sort directly from spool 18 would cause the strip to be subjected to considerable strain due to the necessity of overcoming the inertia of the spool and the strip coiled thereon. It is desirable, therefore, to provide means for advancing strip 14 from supply spool 18 in a manner which is slower and more continuous than the manner in which it is advanced between rollers 30 and 32. The strip is advanced by the last-mentioned means into a take-up loop, indicated at 118, from which it may be drawn suddenly and rapidly between rollers 30 and 32. In the form shown, this strip-advancing means comprises a pair of feed rollers 120 and 122 mounted in the lower portion of housing 10 below supply spool 18. Feed roller 120 is driven through a magnetic clutch 124 and a sprocket 126 meshed with drive chain 98, and feed roller 122 is urged into juxtaposition with roller 120 by resilient means schematically indicated at 128.

At the start of a processing cycle, take-up loop 118 is of sufficient length to permit the sudden and rapid advancement of an image-receiving area of strip 14 with its associated container 20 between rollers 30 and 32, and feed rollers 120 and 122 are preferably already in motion. Magnetic clutch 124, through which feed roller 120 is driven, is engaged preferably when exposure is made or at least at the same time clutch 100 driving rollers 30 and 32 is actuated. As a means for controlling the length of strip 14 advanced into loop 118, there is provided a bearing member 130 located adjacent roller 122 below supply spool 18 above the path or strip 14 and having a bearing surface across which strip 14 is adapted to move. The bearing surface of member 130 is provided with a pair of grooves or slots 132 over which a pair of apertures in strip 14 are adapted to move in aligned relation, thus permitting a pair of stop pins 134 mounted in alignment with grooves 132 to project into a pair of apertures in strip 14 when the apertures become aligned with the pins during advancement of the strip. Pins 134 are mounted for movement in the direction of advancement of strip 14 and in a direction substantially perpendicular to the plane of said strip as it is advanced across bearing member 130. Resilient means are provided for urging pins 134 into contact with strip 14 and in a direction opposite the direction of advancement of the strip. A suitable switch is provided in an electrical circuit for energizing magnetic clutch 124 and is adapted to be opened by movement of pins 130 in the direction of advancement of strip 14 to disengage clutch 124 and discontinue rotation of feed roller 120. In order to withdraw stop pins 134 from perforations in strip 14 when clutch 124 is actuated at the start of each successive exposure and processing cycle, there is provided an inclined member 136 against which a means mounting pins 134 is drawn as the strip is advanced. Member 136, being inclined, coacts with the pin-mounting means to cause the pins to be withdrawn from the strip whereupon the pins are returned by the aforementioned resilient means in a direction opposite the direction of advancement of the strip. When the camera is operated at or near its maximum speed, loop feed roller 120 may be caused to run continuously. Additionally, a guide roller 138 may be provided for guiding strip 14 from spool 18 across bearing member 130, and a curved intermediate wall 140 may be provided adjacent supply spool 18 between the latter and the end wall of housing 10 to define a chamber through which loop 118 may be advanced without interfering with supply spool 18.

As a means for operating the processing timing rollers, elevator roller, elevator platform and cutting means, there is provided a sprocket 142 meshed with drive chain 98 and a drive gear 144 connected with sprocket 142. Elevator roller 60 is driven directly by a shaft 146 to which is secured a gear 148 meshed with drive gear 144. For driving timing rollers 54 and 56, there is provided such means as a helical gear 150 secured to shaft 146 and meshed with another helical gear 152 secured at one end of a shaft 154 disposed in a plane substantially perpendicular to shaft 146. Gear 76 on timing roller 54 is driven by a transfer gear 156 which is in turn connected through a shaft to a helical gear 158 meshed with another helical gear 160 secured to the other end of shaft 154.

Elevator platform 34 and cutting blades 36 and 38 are operated from a single cam shaft 162 located just below the central portion of platform 34 and extending transversely thereof. Cam shaft 162 is connected through a magnetic clutch or preferably a single revolution clutch 164 and a gear 166 to drive gear 144. Clutch 164 is preferably actuated by the movement of stop pins 116 in strip 14 and causes one revolution of cam shaft 162. Stop pins 116 are withdrawn from strip 14 during the rotation of cam shaft 162 by a suitable cam mounted thereon. Mounted on cam shaft 162 are a pair of heart-shaped cams 168 each mounted with its apex 180° from the other for causing the rotation of cutting blades 36 and 38. Secured to a disk-like element 44 of each of cutting blades 36 and 38 is a sector gear 170 meshed with another sector gear 172 pivotally mounted therebelow. To each sector gear 172 is secured a cam follower 174 adapted to ride on and coact with a heart-shaped cam 168. The cams are adapted, during the first 180° of rotation of cam shaft 162, to rotate blade 36 clockwise and blade 38 counter-clockwise (viewing Fig. 1) through approximately 90° and, during the last 180° of rotation of shaft 162, permit the return movement of the cutting blades through 90° to their original positions. Suitable spring means are provided for biasing sector gears 172 toward cams 168 to hold cam followers 174 in engagement with the cams and for causing the counterclockwise and clockwise rotation of, respectively, blades 36 and 38.

Elevator platform 34 is adapted to be pivoted upwards and back (clockwise and counterclockwise viewing Fig. 1) after blades 36 and 38 have severed the sandwich and during the second 180° of rotation of cam shaft 162. To effect this movement of the platform, there is provided a cam 176 adapted to coact with a cam follower in the form of a bell crank 178 for pivoting the crank counterclockwise during the third 90° of rotation of shaft 192 and clockwise during the last 90° of rotation of the shaft. Crank 178 is pivoted at a point adjacent the side of shaft 162 at which blade 38 is mounted and adjacent the lower side of platform 34. One arm of crank 178 is pivotally secured to platform 34 adjacent anvil 42 so as to pivot the platform in a clockwise direction when crank 178 is pivoted in a counterclockwise direction.

Ejection roller 64 is driven continuously through a slip clutch 180 connected through gears 182 to a sprocket 184 engaged with drive chain 98. To insure engagement of a sandwich, advanced by timing rollers 54 and 56, by ejection rollers 62 and 64, two pairs of rollers are so positioned with respect to one another that one end of the sandwich is engaged by the ejection rollers while the other end is still in engagement with the timing rollers. It is to prevent damage to the sandwich or premature withdrawal of the sandwich from between the timing rollers when the ejection rollers suddenly "grab" the sandwich that roller 64 is driven through a slip clutch. Slip clutch 180 permits the ejection rollers to stop rotating momentarily or to rotate at the same speed as the timing rollers during the period when the sandwich is engaged at its ends by both pairs of rollers.

In operation, the operative cycle of the camera is substantially automatic and is initiated by energizing magnetic clutch 124 to start the rotation of loop feed rollers 120 and 122 immediately prior to or during exposure. Rollers 120 and 122 commence to advance strip 14 into take-up loop 118 which is already of sufficient length to permit the withdrawal of an image-receiving area therefrom. During advancement of strip 14, stop pins 134 are withdrawn from the perforations with which they were engaged and are returned to a position wherein they are capable of being engaged by the next successive pair of perforations to cause clutch 124 to be disengaged when a predetermined length of strip 14 has been advanced into loop 118. Immediately following the exposure of a frame of photosensitive strip 12, magnetic clutch 100 is engaged for driving pressure rollers 30 and 32 to superpose a frame of strip 12 with an image area of strip 14 and spread processing liquid from the container 20 associated with the image-receiving area between the frame and area to form a sandwich which is advanced by the rollers into processing chamber 48 onto platform 34. As the strips are advanced between rollers 30 and 32, stop pins 116 ride on the surface of strip 14 until they become aligned with a pair of apertures in the strip, whereupon they are engaged by the apertures and are carried forward by the strip to open a switch for disengaging clutch 100 and for actuating a single revolution clutch 164 to drive cam shaft 162. During the first 180° of rotation of cam shaft 162, cams 168 mounted thereon cause elongated cutting blades 36 and 48 to rotate and cut the sandwich adjacent the ends of the superposed frame and area and thereby sever the portion of the sandwich containing the frame and area from the end portion of the sandwich including a ruptured container 20 and from the remaining portions of the sandwich extending between rollers 30 and 32. Elevator roller 60 and timing rollers 54 and 56 are driven directly and continuously while ejection rollers 62 and 64 are driven continuously through slip clutch 180. During the second 180° of rotation of cam shaft 162, cam 176 causes elevator platform 34 to be pivoted upward to bring the sandwich positioned thereon into contact with roller 60 for advancing the sandwich into the bite of timing rollers 54 and 56 and then causes elevator platform 34 to be returned to its original position in preparation for receiving the next successive sandwich. Timing rollers 54 and 56 rotate at a uniform speed calculated to advance each sandwich through chamber 48 into the bite of ejection rollers 62 and 64 at the end of a predetermined processing period. The ejection rollers immediately eject the sandwich from the processing chamber, whereupon the image-receiving area of strip 14 may be stripped from the frame of strip 12 with which it is superposed.

It is to be understood that the processing mechanism of the herein disclosed camera is suitable for use in conjunction with many photographic devices other than with a camera lens and shutter and may be used, for example, with devices associated with X-radiation, infrared radiation, ultraviolet radiation and various recording devices.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus for exposing and thereafter processing successive frames of a photosensitive strip, in combination, means defining a processing chamber within which each exposed frame of a photosensitive strip is retained during a predetermined processing period, pressure-applying means positioned intermediate the ends of said processing chamber for superposing each successive exposed frame of said photosensitive strip with an area of another strip to form a sandwich comprising said strips and a processing composition so distributed between the outer surfaces of said strips as to be capable of performing said processing, the last-mentioned means advancing said sandwich into said processing chamber toward one end thereof, first cutting means mounted within said processing chamber adjacent said pressure-applying means for severing said sandwich from the remaining portions of said strips, second cutting means mounted within said chamber adjacent said one end thereof substantially in the same plane as said first cutting means and predeterminedly spaced therefrom, said second cutting means cooperating with said first cutting means for cutting said sandwich to a predetermined length, support means positioned within said chamber between said first and second cutting means for positioning said sandwich during severance, first sandwich-advancing means within said chamber positioned adjacent and above said first cutting means, and second sandwich-advancing means operative independently of said first sandwich-advancing means and mounted within said chamber adjacent the other end thereof and spaced from said first sandwich-advancing means by a distance less than the distance between said first and second cutting means.

2. In photographic apparatus for exposing and thereafter processing successive frames of a photosensitive strip, in combination, means defining a processing chamber within which each exposed frame of a photosensitive strip is retained during a predetermined processing period, a first pair of juxtaposed rollers positioned intermediate the ends of said processing chamber for superposing each successive exposed frame of said photosensitive strip with an area of another strip to form a sandwich comprising said strips and a processing composition so distributed between the outer surfaces of said strips as to be capable of performing said processing, the last-mentioned means advancing said sandwich into said processing chamber toward one end thereof, first and second cutting means mounted within said chamber substantially in a plane tangent to said first pair of rollers for severing said sandwich, said first cutting means being positioned adjacent said first pair of rollers and said second cutting means being positioned adjacent said one end of said chamber and predeterminedly spaced from said first cutting means, a support member movably mounted between said first and second cutting means and having a support surface for positioning a sandwich substantially in said plane during severance, a second pair of juxtaposed rollers mounted within said chamber adjacent and above said first cutting means, means for rotating said second pair of rollers at a speed calculated to advance a cut sandwich completely between said second pair of rollers toward the other end of said chamber during a predetermined processing period, means for moving said support member so as to feed said cut sandwich into the bite of said second pair of rollers following cutting of said sandwich to a predetermined length, a third pair of juxtaposed rollers mounted within said processing chamber adjacent said other end of said chamber in the path of a sandwich advanced by said second pair of rollers, said third pair of rollers being spaced from said second pair of rollers by an amount less than the spacing between said first and second cutting means, and means for rotating said third pair of rollers independently of said second pair of rollers so as to eject said sandwich from said processing chamber upon advancement of said sandwich from engagement with said second pair of rollers at the end of said predetermined processing period.

3. In photographic apparatus of the character described, in combination, means for superposing an exposed frame of a photosensitive strip with an area of another strip to form a sandwich, means for cutting said sandwich adjacent its ends to a predetermined length, a pair of timing rollers, means for rotating said timing rollers at a substantially uniform speed calculated to advance said sandwich completely between said timing rollers during a predetermined processing period, means for feeding said sandwich into the bite of said timing rollers following its severance from the remaining portions of said strips, a pair of ejection rollers so positioned with respect to said timing rollers as to engage said sandwich prior to its advancement from engagement with said timing rollers, and means for rotating said ejection rollers independently of said timing rollers so as to advance said sandwich from the apparatus as said sandwich is advanced from engagement with said timing rollers.

4. In photographic apparatus of the character described, in combination, pressure-applying means for superposing successive exposed frames of a photosensitive strip with areas of another strip and distributing a processing composition between each frame and area to form a sandwich, means defining a processing chamber into which said sandwich is advanced and in which it is retained during a predetermined processing period, severing means within said processing chamber for cutting said sandwich adjacent opposite ends thereof to a predetermined length, a pair of timing rollers mounted within said chamber, means for rotating said rollers at a speed calculated to advance said sandwich within said chamber completely through said timing rollers during said predetermined processing period, means within said chamber for supporting said sandwich during severance and for feeding said sandwich into the bite of said timing rollers following its severance from the remaining portions of said strips, a pair of ejection rollers mounted at one end of said chamber and being so positioned with respect to said timing rollers as to engage said sandwich prior to its advancement from engagement with said timing rollers, and means for so rotating said ejection rollers independently of said timing rollers as to eject said sandwich from said chamber as said sandwich is advanced from engagement with said timing rollers at the end of said predetermined processing period.

5. In photographic apparatus of the character described, in combination, guide means for positioning successive frames of a photosensitive strip for exposure, means for superposing each successive exposed frame of said photosensitive strip with an area of another strip to form a sandwich comprising said strips and a processing composition so distributed between the outer surfaces of said strips as to be capable of predeterminedly processing said strips, cutting means predeterminedly spaced apart for cutting said sandwich at opposite ends thereof to a predetermined length, support means for supporting said sandwich between said cutting means during cutting, a pair of timing rollers, means for rotating said timing rollers at a predetermined speed for advancing said sandwich completely between said timing rollers during a predetermined processing period, means for moving said support means so as to feed said sandwich into the bite of said timing rollers following its severance from the remaining portions of said strips, a pair of ejection rollers positioned in the path of said sandwich, advanced by said timing rollers, and spaced from said timing rollers by a distance which is less than the predetermined length of the cut sandwich, and means for rotating said ejection rollers independently of said timing rollers so as to advance said sandwich from the apparatus as said sandwich is fed by said timing rollers into the bite of said ejection rollers.

6. In photographic apparatus for exposing and thereafter processing successive frames of a photosensitive strip, in combination, means defining a processing chamber in which each successive exposed frame of a photosensitive strip is retained during a predetermined processing period, a pair of pressure-applying rollers for superposing each successive exposed frame of said photosensitive strip with an area of another strip to form a sandwich comprising said strips and a processing composition so distributed between the outer surfaces of said strips as to be capable of performing said processing, said pressure-applying rollers advancing said strips into said processing chamber, a pair of cutting devices mounted within said chamber and predeterminedly spaced apart for cutting said sandwich at opposite ends thereof to a predetermined length, movable support means for positioning said sandwich between said cutting devices during severance of said sandwich from the other portions of said strips, a pair of timing rollers mounted within said processing chamber, means for rotating said timing rollers at a predetermined speed calculated to advance said sandwich within said chamber completely through said timing rollers during said predetermined processing period, means for so moving said support means as to feed said sandwich following its severance into the bite of said timing rollers, a pair of ejection rollers mounted at one end of said processing chamber in the path of a sandwich advanced by said timing rollers and being so positioned with respect to said timing rollers as to engage said sandwich prior to its advancement from engagement with said timing rollers, and means for so rotating said ejection rollers independently of said timing rollers as to rapidly advance said sandwich from said chamber at the end of said predetermined processing period upon advancement of said sandwich from engagement with said timing rollers.

7. In photographic apparatus for exposing and thereafter processing successive frames of a photosensitive strip, in combination, means defining a processing chamber in which each successive exposed frame of a photosensitive strip is retained during a predetermined processing period, a pair of pressure-applying rollers for superposing each successive exposed frame of said photosensitive strip with an area of another strip to form a sandwich comprising said strips and a processing composition so distributed between the outer surfaces of said strips as to be capable of performing said processing, said pressure-applying rollers advancing said sandwich into said processing chamber, a pair of cutting members mounted within said chamber and predeterminedly spaced apart for cutting said sandwich adjacent its opposite ends to a predetermined length, a movable support platform located within said processing chamber between said cutting members for positioning said sandwich during severance from the remaining portions of said strips, a pair of timing rollers mounted within said processing chamber adjacent said pressure-applying rollers, means for rotating said timing rollers at a predetermined speed calculated to advance said sandwich within said chamber completely through said timing rollers during said predetermined processing period, a feed roller positioned within said processing chamber adjacent said platform with its axis substantially parallel to the plane of said platform, means for so moving said platform that one end thereof is adjacent the bite of said timing rollers and a sandwich positioned thereon is moved into contact with said feed roller, and means for so rotating said feed roller as to feed a sandwich into the bite of said timing rollers.

8. In photographic apparatus for exposing and thereafter processing successive frames of a photosensitive strip, in combination, means defining a processing chamber in which each successive exposed frame of a photosensitive strip is retained during a predetermined processing period, a pair of pressure-applying rollers for superposing each successive exposed frame of said photosensitive strip with an area of another strip to form a sandwich comprising said strips and a processing composition so distributed between the outer surfaces of said strips as to be capable of performing said processing, said pressure-applying rollers advancing said sandwich into said processing chamber, a pair of cutting members mounted within said chamber and predeterminedly spaced apart for cutting said sandwich adjacent its opposite ends to a predetermined length, a movable support platform located within said processing chamber between said cutting members for positioning said sandwich during severance from the remaining portions of said strips, a pair of timing rollers mounted within said processing chamber adjacent said pressure-applying rollers, means for rotating said timing rollers at a predetermined speed calculated to advance said sandwich within said chamber toward one end thereof completely through said timing rollers during said predetermined processing period, means for so moving said platform as to feed a sandwich positioned thereon into the bite of said timing rollers, a pair of ejection rollers mounted within said processing chamber at one end thereof in the path of a sandwich advanced by said timing rollers, means for guiding a sandwich from said timing rollers into the bite of said ejection rollers, said ejection rollers being spaced from said timing rollers by a distance less than the predetermined length of a cut sandwich so that said ejection rollers engage said sandwich prior to its advancement from engagement with said timing rollers, and means for so rotating said ejection rollers independently of said timing rollers as to advance said sandwich from said chamber at the end of said predetermined processing period upon advancement of said sandwich by said timing rollers from engagement therewith.

9. In photographic apparatus for exposing and thereafter processing successive frames of a photosensitive strip, in combination, guide means for positioning successive frames of a photosensitive strip for exposure, means defining a processing chamber within which each exposed frame of said photosensitive strip is retained during a predetermined processing period, means for superposing each successive exposed frame of said photosensitive strip with an area of another strip to form a sandwich comprising said strips and a processing composition so distributed between the outer surfaces of said strips as to be capable of performing said processing, the last-mentioned means advancing said sandwich into said processing chamber, means responsive to the movement of said other strip for controlling the length of said strips advanced into said processing chamber, the last-mentioned means being engageable by portions of said other strip associated with each successive area thereof for arresting the movement of said strips when one area of said other strip with a superposed frame has advanced into said processing chamber, strip-advancing means within said chamber for moving said sandwich at a predetermined rate through said chamber toward one end thereof, and means mounted within said chamber at said one end thereof and operative independently of said first strip-advancing means for ejecting said sandwich from said chamber at the end of said predetermined processing period.

10. In photographic apparatus for exposing and thereafter processing successive frames of a photosensitive strip, in combination, means defining a processing chamber within which each of successive exposed frames of a photosensitive strip is retained during a predetermined processing period, a pair of pressure-applying rollers for superposing each successive exposed frame of said photosensitive strip with an area of another strip to form a sandwich comprising said strips and a processing composition so distributed between the outer surfaces of said strips as to be capable of performing said processing, said pressure-applying rollers advancing said sandwich into said processing chamber, means for controlling the rotation of said pressure-applying rollers, the last-mentioned means including means engageable by portions of said other strip associated with each successive area thereof for arresting the rotary movement of said pressure-applying rollers when an area of said other strip and a superposed frame have been advanced into said processing chamber, strip-advancing means within said chamber for moving said sandwich at a predetermined rate through said chamber toward one end thereof, and means mounted within said chamber at said one end thereof and operative independently of said strip-advancing means for ejecting said sandwich from said chamber at the end of said predetermined processing period.

11. In photographic apparatus for exposing and thereafter processing successive frames of a photosensitive strip, in combination, means for mounting supplies of a photosensitive strip and another strip, guide means for positioning successive frames of said photosensitive strip for exposure, a pair of feed rollers for advancing said other strip from its supply into a take-up loop, means responsive to the movement of said other strip between said feed rollers for controlling the rotation of said rollers, the last-mentioned means including engagement members positioned adjacent said rollers in contact with said other strip and adapted to be engaged by successive regularly spaced perforations in said other strip as said perforations become aligned with said members and means coupled with said engagement members and responsive to movement thereof for arresting the rotation of said rollers upon movement of said engagement members by said other strip, means defining a processing chamber within which each exposed frame of said photosensitive strip is retained during a predetermined processing period, a pair of pressure-applying rollers for advancing each successive area of said other strip from said take-up loop into superposition with an exposed frame of said photosensitive strip to form a sandwich comprising said strips and a processing composition so distributed between the outer surfaces of said strips as to be capable of effecting said processing, said pressure-applying rollers advancing said sandwich into said processing chamber, and means responsive to the movement of said other strip for controlling the rotation of said pressure-applying rollers and thereby controlling the length of said strips advanced into said processing chamber, the last-mentioned means including engagement members positioned adjacent said pressure-applying rollers in contact with said other strip, said engagement members being engageable by said perforations as they become aligned with said engagement members, the latter being movable by said other strip for arresting the rotation of said pressure-applying rollers.

12. In photographic apparatus of the character described, in combination, means for mounting supplies of a photosensitive strip and another strip, guide means for positioning successive frames of said photosensitive strip for exposure, a pair of feed rollers for advancing said other strip from its supply into a take-up loop, means for so controlling the rotation of said feed rollers as to advance successive predetermined lengths of said other strip into said take-up loop, the last-mentioned means including first clutch means for connecting said rollers with substantially continuously moving drive means, a first pair of pins mounted adjacent said rollers in contact with said other strip for limited movement in the direction of advancement of said other strip, said pins being engageable by successive regularly spaced pairs of apertures in said other strip for moving said pins, and means actuated by movement of said pins for disengaging said first clutch means, means defining a processing chamber within which each exposed frame of said photosensitive strip is retained during a predetermined processing period, a pair of pressure-applying rollers for advancing each of successive areas of said other strip from said take-up loop into superposition with an exposed frame of said photosensitive strip to form a sandwich comprising said strips and a processing composition so distributed between the outer surfaces of said strips as to be capable of performing said processing, said pressure-applying rollers advancing said sandwich into said processing chamber, and means for so controlling the rotation of said pressure-applying rollers as to advance successive predetermined lengths of said sandwich into said processing chamber, the last-mentioned means including second clutch means for operatively connecting said pressure-applying rollers with said drive means, a second pair of pins mounted adjacent said pressure-applying rollers for limited movement in the direction of advancement of said other strip and in contact with said other strip, said second pair of pins being engageable by said apertures for moving said second pair of pins, and means actuated by movement of said second pair of pins for disengaging said second clutch means and for withdrawing said second pair of pins from engagement with said apertures after rotation of said pressure-applying rollers has been arrested.

13. In photographic apparatus for exposing and thereafter processing successive frames of a photosensitive strip, in combination, means defining a processing chamber within which each of successive exposed frames of a photosensitive strip is retained during a predetermined processing period, a pair of pressure-applying rollers for superposing each successive exposed frame of said photosensitive strip with an area of another strip to form a sandwich comprising said strips and a processing composition so distributed between the outer surfaces of said strips as to be capable of performing said processing, said pressure-applying rollers advancing said sandwich into said processing chamber, severing members within said processing chamber for cutting said sandwich adjacent its opposite ends to a predetermined length, and means responsive to the movement of said other strip for controlling the rotation of said pressure-applying rollers and thereby controlling the length of said strips advanced through said apparatus between said pressure-applying rollers into said processing chamber, the last-mentioned means controlling the function of said severing members and including control members positioned adjacent said pressure-applying rollers in contact with said other strip, said control members being engageable and movable by successive regularly spaced portions of said other strip, and means coupled with said control members and responsive to their movement for arresting the rotation of said pressure-applying rollers and for initiating the cutting action of said severing members.

14. In photographic apparatus of the character described, in combination, means defining a processing chamber within which each of successive exposed frames of a photosensitive strip is retained during a predetermined processing period, a pair of pressure-applying rollers for superposing successive exposed frames of said photosensitive strip with areas of another strip to form a sandwich comprising said strips and a processing composition so distributed between the outer surfaces of said strips as to be capable of performing said processing, said pressure-applying rollers advancing said sandwich into said processing chamber, a pair of severing members mounted within said processing chamber for cutting said sandwich adjacent its opposite ends to a predetermined length, means for so controlling the rotation of said pressure-applying rollers as to advance a predetermined length of said sandwich into said processing chamber, the last-mentioned means controlling the cutting movement of said severing members and including first clutch means for operatively connecting said pressure-applying rollers with substantially continuously running drive means, second clutch means for operatively connecting said severing members with said drive means, engagement members mounted adjacent said pressure-applying rollers in contact with said other strip for limited movement in the direction of advancement of said other strip, said engagement members being engageable and movable by successive regularly spaced apertures in said other strip, and means associated with said engagement members and actuated by their movement for disengaging said first clutch means, for engaging said second clutch means and for withdrawing said engagement members from engagement with said apertures after rotation of said pressure-applying rollers has been arrested.

15. In photographic apparatus of the character described, in combination, means defining a processing chamber within which each of successive exposed frames of a photosensitive strip is retained during a predetermined processing period, a pair of pressure-applying rollers for superposing each successive exposed frame of said photosensitive strip with an area of another strip to form a sandwich comprising said strips and a processing composition so distributed between the outer surfaces of said strips as to be capable of performing said processing, said pressure-applying rollers advancing said sandwich into said processing chamber, a pair of severing members mounted within said processing chamber for cutting said sandwich adjacent its opposite ends to a predetermined length, means for so controlling the rotation of said pressure-applying rollers as to advance a predetermined length of said sandwich into said processing chamber and for controlling the cutting movement of said severing members, the last-mentioned means including first clutch means operatively connecting said pressure-applying rollers with substantially continuously moving drive means, a pair of pins mounted adjacent said rollers in contact with said other strip and for limited movement in the direction of advancement of said other strip, said pins being engageable and movable by successive regularly spaced pairs of apertures in said other strip, means for imparting a rotary cutting movement to said severing members and for withdrawing said pins from engagement with said apertures following the arrestment of rotation of said pressure-applying rollers, second clutch means for operatively connecting the last-mentioned means to said drive means, and means associated with said pins and responsive to movement thereof for disengaging said first clutch means and engaging said second clutch means.

16. In photographic apparatus for exposing and thereafter processing successive frames of a photosensitive strip, in combination, means defining a processing chamber within which each successive exposed frame of a photosensitive strip is maintained during a predetermined processing period, a pair of pressure-applying rollers for superposing successive exposed frames of said photosensitive strip with areas of another strip to form a sandwich comprising said strips and a processing composition so distributed between the outer surfaces of said strips as to be capable of performing said processing, said pressure-applying rollers advancing said sandwich into said processing chamber, a pair of cutting members mounted within said chamber and predeterminedly spaced apart with one of said cutting members positioned adjacent said pressure-applying rollers, a pair of support members associated with said cutting members and having support surfaces substantially in a plane tangent to said pressure-applying rollers, said support members positioning end portions of said sandwich during cutting and cooperating with said cutting members for cutting said sandwich to a predetermined length, a support platform extending between said support members and having a support surface disposed substantially in the plane of said support surfaces of said support members, said platform being mounted for pivotal movement about an axis adjacent the other of said cutting members positioned furthest from said pressure-applying rollers, means for so rotating said pressure-applying rollers as to advance a sandwich in one direction onto said support platform, a pair of timing rollers mounted within said processing chamber substantially above said one cutting member, means for so rotating said timing rollers as to advance said sandwich through said processing chamber in a direction substantially opposite to said one direction, a feed roller located above said platform with its axis substantially parallel to the plane of said platform, means for so pivoting said platform upwards as to position the end of said platform adjacent the bite of said timing rollers and to bring a sandwich positioned on said platform into contact with said feed roller, and means for so rotating said feed roller as to advance said sandwich in said opposite direction into the bite of said timing rollers.

17. In photographic apparatus of the character described, in combination, a pair of pressure-applying rollers for superposing each of successive exposed frames of a photosensitive strip with an area of another strip to form a sandwich comprising said strips and a processing composition so distributed between the outer surfaces of said strips as to be capable of predeterminedly processing said strips, a pair of severing members for cutting said sandwich at its opposite ends from the other portions of said strips and to a predetermined length, a support member for positioning said sandwich during severance, first clutch means for operatively connecting said pressure-applying rollers with drive means, means for so controlling the rotation of said pressure-applying rollers as to advance a predetermined length of said sandwich onto said support member, the last-mentioned means including engagement members positioned in contact with said other strip and engageable and movable by successive regularly spaced engagement portions of said other strip, means responsive to the movement of said engagement members for disengaging said first clutch means, a pair of timing rollers for advancing each cut sandwich during a predetermined processing period, means for causing the cutting movement of said severing members and for so moving said support member as to feed a cut sandwich into the bite of said timing rollers, second clutch means for operatively connecting the last-mentioned means with said drive means, and means responsive to the movement of said engagement members for actuating said second clutch means.

18. In photographic apparatus of the character described, in combination, a pair of pressure-applying rollers for superposing each of successive exposed frames of a photosensitive strip with an area of another strip to form a sandwich comprising said strips and a processing composition so distributed between the outer surfaces of said strips as to be capable of predeterminedly processing said strips, a pair of severing members for cutting said sandwich at its opposite ends from the other portions of said strips and to a predetermined length, a support member for positioning said sandwich during severance, first clutch means for operatively connecting said pressure-applying rollers with drive means, means for so controlling the rotation of said pressure-applying rollers as to advance a predetermined length of said sandwich onto said support member, the last-mentioned means including engagement members positioned in contact with said other strip and engageable with and movable by successive regularly spaced engagement portions of said other strip as said portions become aligned with said engagement members and means responsive to the movement of said engagement members for disengaging said first clutch means, a pair of timing rollers for advancing each cut sandwich during a predetermined processing period, and means for causing the cutting movement of said severing members and for so moving said support member as to feed a cut sandwich into the bite of said timing rollers, the last-mentioned means including cam means, means responsive to a single revolution of said cam means for causing the cutting movement of said severing members during the first half revolution of said cam means and for so moving said support member as to feed a cut sandwich into the bite of said timing rollers during the second half revolution of said cam means, a single revolution clutch for operatively connecting said cam means with said drive means, and means responsive to the movement of said engagement members for actuating said single revolution clutch.

19. In photographic apparatus of the character described, in combination, a pair of pressure-applying rollers for superposing each of successive exposed frames of a photosensitive strip with an area of another strip to form a sandwich comprising said strips and a processing composition so distributed between the outer surfaces of said strips as to be capable of predeterminedly processing said strips, a pair of severing members for cutting said sandwich at its opposite ends from the other portions of said strips and to a predetermined length, a support member for positioning said sandwich during severance, first clutch means for operatively connecting said pressure-applying rollers with drive means, means for so controlling the rotation of said pressure-applying rollers as to advance a predetermined length of said sandwich onto said support member, the last-mentioned means including engagement members positioned in contact with said other strip and engageable with and movable by successive regularly spaced engagement portions of said other strip as said portions become aligned with said engagement members and means responsive to the movement of said engagement members for disengaging said first clutch means, a pair of timing rollers, cam means, means coacting with said cam means and so responsive to the rotary movement of said cam means during a single revolution thereof as to impart a cutting motion to said severing members to so move said support members as to feed a cut sandwich into the bite of said timing rollers and to withdraw said engagement members from engagement with said engagement portion, a single revolution clutch operatively connecting said cam means with said drive means, and means responsive to the movement of said engagement members for actuating said single revolution clutch.

20. In photographic apparatus for exposing and thereafter processing successive frames of a photosensitive strip, in combination, means defining a processing chamber within which each exposed frame of a photosensitive strip is retained during a predetermined processing period, means for superposing each of successive exposed frames of said photosensitive strip with an area of another strip to form a sandwich comprising said strips and a processing composition so distributed between the outer surfaces of said strips as to be capable of performing said processing, the last-mentioned means advancing said sandwich into said processing chamber, severing means within said processing chamber for cutting said sandwich to a predetermined length, a first pair of juxtaposed rollers within said processing chamber, substantially continuously running drive means, means operatively connecting said first pair of rollers with said drive means for continuously rotating said rollers at a substantially uniform predetermined speed calculated to move a sandwich completely between said rollers during a predetermined processing period, a second pair of juxtaposed rollers mounted within said chamber substantially in the path of movement of a sandwich advanced from said first pair of rollers, said second pair of rollers being spaced from said first pair of rollers by a distance less than the length of a cut sandwich, and means including a slip clutch for operatively connecting said second pair of rollers with said drive means for so rotating said second pair of rollers independently of said first pair of rollers as to advance said sandwich at a speed substantially faster than its speed of advancement by said first pair of rollers.

21. In photographic apparatus of the character described, in combination, means defining a processing chamber within which each successive exposed frame of a photosensitive strip is retained during a predetermined processing period, means for superposing each of successive exposed frames of said photosensitive strip with an area of another strip to form a sandwich comprising said strips and a processing composition so distributed between the outer surfaces of said strips as to be capable of predeterminedly processing said strips, the last-mentioned means advancing said sandwich in one direction into said processing chamber, severing means within said processing chamber for cutting said sandwich to a predetermined length, a first pair of juxtaposed rollers within said processing chamber, substantially continuously running drive means, means operatively connecting said first pair of rollers with said drive means for continuously rotating said rollers at a substantially uniform predetermined speed calculated to move a sandwich in a direction substantially opposite to said one direction and completely between said rollers during a predetermined processing period, a second pair of juxtaposed rollers mounted within said chamber in the path of movement of a sandwich from said first pair of rollers, said second pair of rollers being so spaced from and positioned with respect to said first pair of rollers as to engage a sandwich advanced by said first pair of rollers prior to disengagement of said sandwich from said first pair of rollers, and means including a slip clutch operatively connecting said second pair of rollers with said drive means to rotate said second pair of rollers independently of said first pair of rollers so as to advance said sandwich at a speed substantially faster than its speed of advancement by said first pair of rollers, said second pair of rollers advancing said sandwich in said opposite direction from said chamber upon advancement of said sandwich from engagement with said first pair of rollers.

22. In apparatus for processing successive sandwiches each comprising areas of two sheets in superposed relation with a processing composition so distributed between the outer surfaces of said sheets as to be capable of performing said processing, in combination, means defining a processing chamber within which each of said sandwiches is retained during a predetermined processing period, a pair of rollers positioned intermediate the ends of said processing chamber for advancing successive sandwiches into said processing chamber toward one end thereof, first cutting means mounted within said processing chamber adjacent said rollers for severing said sandwich from the remaining portions thereof extending between said rollers, second cutting means mounted within said chamber adjacent said one end thereof substantially in the plane of said first cutting means and predeterminedly spaced therefrom, said second cutting means cooperating with said first cutting means for cutting said sandwich to an accurately predetermined length, support means positioned within said chamber between said first and second cutting means for positioning said sandwich during severance, first sandwich-advancing means within said chamber positioned adjacent and above said first cutting means, and second sandwich-advancing means operative independently of said first sandwich-advancing means, said second sandwich-advancing means being mounted within said chamber adjacent the opposite end thereof and spaced from said first sandwich-advancing means by a distance less than the distance between said first and second cutting means.

23. In apparatus for processing successive sandwiches each comprising an area of two sheet materials in superposed relation with a processing composition so distributed between the outer surfaces of said sheets as to be capable of predeterminedly processing said sheets, in combination, means defining a processing chamber within which each of said sandwiches is maintained during a predetermined processing period, a first pair of juxtaposed rollers positioned intermediate the ends of said processing chamber for advancing successive sandwiches into said processing chamber toward one end thereof, first and second cutting means, mounted within said chamber substantially in a plane tangent to said first pair of rollers, for severing said sandwich, said first cutting means being positioned adjacent said first pair of rollers and said second cutting means being positioned adjacent said one end of said chamber and predeterminedly spaced from said first cutting means, a support member movably mounted between said first and second cutting means and having a support surface for positioning a sandwich substantially in said plane during severance, a second pair of juxtaposed rollers mounted within said chamber adjacent and above said first cutting means, means for rotating said second pair of rollers at a speed calculated to advance a cut sandwich completely between said rollers toward the other end of said chamber during a predetermined processing period, means for so moving said support member as to feed said cut sandwich into the bite of said second pair of rollers following cutting of said sandwich to a predetermined length, a third pair of juxtaposed rollers mounted within said processing chamber adjacent the other end of said chamber in the path of a sandwich advanced by said second pair of rollers, said third pair of rollers being spaced from said second pair of rollers by an amount less than the spacing between said first and second cutting means, and means for so rotating said third pair of rollers independently of said second pair of rollers as to eject said sandwich from said processing chamber upon advancement of said sandwich from engagement with said second pair of rollers at the end of said predetermined processing period.

24. In photographic apparatus for processing successive exposed frames of a photosensitive strip, in combination, means defining a processing chamber within which each of a plurality of exposed frames of said photosensitive strip is retained during a predetermined processing period, pressure-applying means for superposing an exposed frame of said photosensitive strip with an area of another strip for spreading a fluid processing composition from a container, located between portions of said strips adjacent said superposed frame and area, in a layer between said frame and area to form a sandwich and for advancing said sandwich as it is formed into said processing chamber, means within said processing chamber for supporting said sandwich as it is advanced into said chamber, a pair of cutting means within said chamber at opposite ends of said support means for simultaneously severing a predetermined length of said sandwich adjacent one end from said portions of said strips in the region of said container and adjacent its other end and said pressure-applying means, from the remainder of said strips, extending between said pressure-applying means, advancing means operative independently of said pressure-applying means for initially engaging one end of said sandwich and advancing said sandwich at a predetermined rate through said processing chamber toward one end thereof, and means located within said processing chamber adjacent said one end thereof, in the path of movement of said sandwich through said processing chamber, spaced a predetermined distance from said advancing means, and operative independently of said advancing means for engaging said one end of said sandwich and rapidly ejecting said sandwich from said chamber at the termination of a predetermined processing period initiated when said sandwich was formed and introduced into said processing chamber.

25. In photographic apparatus for processing successive exposed frames of a photosensitive strip, in combination, means defining a processing chamber within which each of a succession of exposed frames of said photosensitive strip is retained during a predetermined processing period, pressure-applying means located intermediate the ends of said processing chamber for superposing an exposed frame of said photosensitive strip with an area of another strip for spreading a fluid processing composition from a container, located between portions of said strips adjacent said superposed frame and area, in a layer between said frame and area to form a sandwich and for advancing said sandwich as it is formed into said processing chamber, means within said processing chamber for supporting said sandwich as it is advanced into said chamber, a pair of cutting means within said chamber at opposite ends of said support means for simultaneously severing a predetermined length of said sandwich adjacent one end from said portions of said strips in the region of said container and adjacent its other end, and said pressure-applying means, from the remainder of said strips extending between said pressure-applying means, advancing means operative independently of said pressure-applying means for initially engaging said other end of said sandwich closest said pressure-applying means and advancing said sandwich at a predetermined rate through said processing chamber toward one end thereof in a direction substantially opposite to the direction of movement of said sandwich between said pressure-applying means into said processing chamber, and means located within said processing chamber adjacent said one end thereof, in the path of movement of said sandwich through said processing chamber, spaced a predetermined distance from said advancing means, and operative independently of said advancing means for engaging said other end of said sandwich and rapidly ejecting said sandwich from said chamber at the termination of a predetermined processing period initiated when said sandwich was formed and introduced into said processing chamber.

26. In photographic apparatus for processing successive exposed frames of a photosensitive strip, in combination, means defining a processing chamber within which each of a plurality of exposed frames of said photosensitive strip is retained during a predetermined processing period, pressure-applying means located intermediate the ends of said processing chamber for superposing an exposed frame of said photosensitive strip with an area of another strip for spreading a fluid processing composition from a container, located between portions of said strips adjacent said superposed frame and area, in a layer between said frame and area to form a sandwich and for advancing said sandwich as it is formed into said processing chamber, means within said processing chamber for supporting said sandwich as it is advanced into said chamber, a pair of cutting means within said chamber at opposite ends of said support means for severing a predetermined length of said sandwich adjacent one end from said portions of said strips in the region of said container and adjacent its other end, and said pressure-applying means, from the remainder of said strips extending between said pressure-applying means, advancing means operative independently of said pressure-applying means for initially engaging said other end of said sandwich closest said pressure-applying means and advancing said sandwich at a predetermined rate through said processing chamber toward one end thereof in a direction substantially opposite to the direction of movement of said sandwich between said pressure-applying means into said processing chamber, means for moving said support means so as to move said other end of said sandwich into engagement with said advancing means, and means located within said processing chamber adjacent said one end thereof, in the path of movement of said sandwich through said processing chamber, spaced a predetermined distance from said advancing means, and operative independently of said advancing means for engaging said other end of said sandwich and rapidly ejecting said sandwich from said chamber at the termination of a predetermined processing period initiated when said sandwich was formed and introduced into said processing chamber.

27. In photographic apparatus for processing successive exposed frames of a photosensitive strip, in combination, means defining a processing chamber within which each of a plurality of exposed frames of said photosensitive strip is retained during a predetermined processing period, pressure-applying means for superposing an exposed frame of said photosensitive strip with an area of another strip for spreading a fluid processing composition from a container, located between portions of said strips adjacent said superposed frame and area, in a layer between said frame and area to form a sandwich and for advancing said sandwich as it is formed into said processing chamber, means within said processing chamber for supporting said sandwich as it is advanced into said chamber, a pair of cutting means within said chamber at opposite ends of said support means for severing a predetermined length of said sandwich adjacent one end from said portions of said strips in the region of said container and adjacent its other end, and said pressure-applying means, from the remainder of said strips extending between said pressure-applying means, advancing means operative independently of said pressure-applying means, for initially engaging one end of said sandwich and advancing said sandwich at a predetermined rate through said processing chamber toward one end thereof, and means located within said processing chamber adjacent said one end thereof and operative independently of said advancing means for engaging said one end of said sandwich and rapidly ejecting said sandwich from said chamber at the termination of a predetermined processing period initiated when said sandwich was formed and introduced into said processing chamber, said last-mentioned means being located in the path of advancement of said sandwich through said processing chamber and spaced from said advancing means by a distance which is less than the distance between said cutting means.

28. In photographic apparatus for exposing and thereafter processing successive frames of a photosensitive strip, in combination, guide means for positioning successive frames of said photosensitive strip for exposure, means defining a processing chamber within which each of a plurality of exposed frames of said photosensitive strip is retained during a predetermined processing period, pressure-applying means for superposing an exposed frame of said photosensitive strip with an area of another strip for spreading a fluid processing composition from a container, located between portions of said strips adjacent said superposed frame and area, in a layer between said frame and area to form a sandwich and for advancing said sandwich as it is formed into said processing chamber, means within said processing chamber for supporting said sandwich as it is advanced into said chamber, a pair of cutting means within said chamber at opposite ends of said support means for severing a predetermined length of said sandwich adjacent one end from said portions of said strips in the region of said container and adjacent its other end and said pressure-applying means, from the remainder of said strips extending between said pressure-applying means, advancing means operative independently of said pressure-applying means for initially engaging said other end of said sandwich and advancing said sandwich at a predetermined rate through said processing chamber toward one end thereof, and means located within said processing chamber adjacent said one end thereof, in the path of movement of said sandwich through said processing chamber, spaced a predetermined distance from said advancing means, and operative independently of said advancing means for engaging said other end of said sandwich and rapidly ejecting said sandwich from said chamber at the termination of a predetermined processing period initiated when said sandwich was formed and introduced into said processing chamber.

29. In photographic apparatus for exposing and thereafter processing successive frames of a photosensitive strip, in combination, guide means for positioning successive frames of said photosensitive strip for exposure, means defining a processing chamber within which each of a plurality of exposed frames of said photosensitive strip is retained during a predetermined processing period, pressure-applying means located intermediate the ends of said processing chamber for superposing an exposed frame of said photosensitive strip with an area of another strip for spreading a fluid processing composition from a container, located between portions of said strips adjacent said superposed frame and area, in a layer between said frame and area to form a sandwich and for advancing said sandwich as it is formed into said processing chamber, means within said processing chamber for supporting said sandwich as it is advanced into said chamber, a pair of cutting means within said chamber at opposite ends of said support means for simultaneously severing a predetermined length of said sandwich adjacent one end from said portions of said strips in the region of said container and adjacent its other end, and said pressure-applying means, from the remainder of said strips extending between said pressure-applying means, advancing means operative independently of said pressure-applying means for initially engaging said other end of said sandwich closest said pressure-applying means and advancing said sandwich at a predetermined rate through said processing chamber toward one end thereof in a direction substantially opposite to the direction of movement of said sandwich between said pressure-applying means into said processing chamber, and means located within said processing chamber adjacent said one end thereof, in the path of movement of said sandwich through said processing chamber, spaced a predetermined distance from said advancing means, and operative independently of said advancing means for engaging said other end of said sandwich and rapidly ejecting said sandwich from said chamber at the termination of a predetermined processing period initiated when said sandwich was formed and introduced into said processing chamber.

30. In photographic apparatus for exposing and thereafter processing successive frames of a photosensitive strip, in combination, guide means for positioning successive frames of said photosensitive strip for exposure, means defining a processing chamber within which each of a plurality of exposed frames of said photosensitive strip is retained during a predetermined processing period, pressure-applying means located intermediate the ends of said processing chamber for superposing an exposed frame of said photosensitive strip with an area of another strip for spreading a fluid processing composition from a container, located between portions of said strips adjacent said superposed frame and area, in a layer between said frame and area to form a sandwich and for advancing said sandwich as it is formed into said processing chamber, means within said processing chamber for supporting said sandwich as it is advanced into said chamber, a pair of cutting means within said chamber at opposite ends of said support means for severing a predetermined length of said sandwich adjacent one end from said portions of said strips in the region of said container and adjacent its other end, and said pressure-applying means, from the remainder of said strips extending between said pressure-applying means, advancing means operative independently of said pressure-applying means for initially engaging said other end of said sandwich closest said pressure-applying means and advancing said sandwich at a predetermined rate through said processing chamber toward one end thereof in a direction substantially opposite to the direction of movement of said sandwich between said pressure-applying means into said processing chamber, means for moving said support means so as to move said other end of said sandwich into engagement with said advancing means, and means located within said processing chamber adjacent said one end thereof, in the path of movement of said sandwich through said processing chamber, spaced a predetermined distance from said advancing means, and operative independently of said advancing means for engaging said other end of said sandwich and rapidly ejecting said sandwich from said chamber at the termination of a predetermined processing period initiated when said sandwich was formed and introduced into said processing chamber.

31. In photographic apparatus for exposing and thereafter processing successive frames of a photosensitive strip, in combination, guide means for positioning successive frames of said photosensitive strip for exposure, means defining a processing chamber within which each of a plurality of exposed frames of said photosensitive strip is retained during a predetermined processing period, pressure-applying means for superposing an exposed frame of said photosensitive strip with an area of another strip for spreading a fluid processing composition from a container, located between portions of said strips adjacent said superposed frame and area, in a layer between said frame and area to form a sandwich and for advancing said sandwich as it is formed into said processing chamber, means within said processing chamber for supporting said sandwich as it is advanced into said chamber, a pair of cutting means within said chamber at opposite ends of said support means for severing a predetermined length of said sandwich adjacent one end from said portions of said strips in the region of said container and adjacent its other end, and said pressure-applying means, from the remainder of said strips extending between said pressure-applying means, advancing means operative independently of said pressure-applying means for initially engaging said other end of said sandwich and advancing said sandwich at a predetermined rate through said processing chamber toward one end thereof, and means located within said processing chamber adjacent said one end thereof and operative independently of said advancing means for engaging said other end of said sandwich and rapidly ejecting said sandwich from said chamber at the termination of a predetermined processing period initiated when said sandwch was formed and introduced into said processing chamber, said last-mentioned means being located in the path of advancement of said sandwich through said processing chamber and spaced from said advancing means by a distance which is less than the distance between said cutting means.

References Cited in the file of this patent

UNITED STATES PATENTS

| | | |
|---|---|---|
| 2,477,291 | Fairbanks | July 26, 1949 |
| 2,477,304 | Land | July 26, 1949 |
| 2,516,398 | Land | July 25, 1950 |